W. A. WALES.
Tweezers.

No. 216,918.      Patented June 24, 1879.

Attest:
C. Clarence Poole
R. N. Dyer.

Inventor:
Wm. A. Wales,
By J. West Wagner
Atty.

UNITED STATES PATENT OFFICE.

WILLIAM A. WALES, OF NEWTON, MASSACHUSETTS, ASSIGNOR TO WM. B. FOWLE, OF SAME PLACE.

IMPROVEMENT IN TWEEZERS.

Specification forming part of Letters Patent No. 216,918, dated June 24, 1879; application filed May 12, 1879.

*To all whom it may concern:*

Be it known that I, WILLIAM A. WALES, of Newton, in the county of Middlesex and State of Massachusetts, have invented certain new and useful Improvements in Tweezers, of which the following is a specification.

My invention relates to tweezers for watchmakers' use, and for other purposes, my object being to construct such a tool so that the small parts of the works of watches can be retained between the jaws of the tweezers when the same are released from the hand of the workman and placed upon the work-bench, thus enabling the workman to have all the parts of his work held by different tweezers and arranged in order before him, and thereby saving much time and trouble; and my object is also to construct such tweezers so that any small piece can be easily and quickly picked up by them, and quickly released without the necessity of operating a clamping nut or screw.

My invention therein consists in a pair of tweezers having jaws sprung together at their points, in combination with a spring-actuated rod for opening such jaws; and, further, in the construction of the several parts composing my tweezers, as fully hereinafter explained.

Figure 1:
Figure 2:
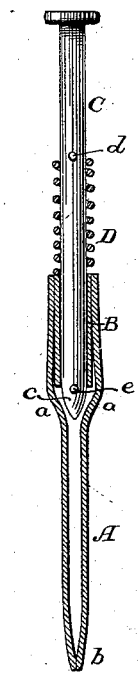

In the accompanying drawings, forming a part hereof, Figure 1 is a perspective view of the improved tweezers, and Fig. 2 a longitudinal section of the same.

The jaws A A of the tweezers are secured at their inner ends to a hollow shank, B. In front of this shank the jaws are bent down to form shoulders $a$, and from these shoulders they approach each other to their points $b$, where they meet and close tightly together. The ends of the jaws A are of the usual shape and size of watch-makers' tweezers, or of any convenient form suitable for the particular use for which they may be intended. Through the hollow shank B is passed a small rod, C, having a conical or wedge-shaped inner end, $c$. When this rod is pushed forward its end strikes the shoulders $a$ and opens the jaws of the tweezers.

A spiral spring, D, is placed upon the rod C, between the outer end of the hollow shank and a pin, $d$, passed through the rod, to keep the conical end of the rod out of contact with the shoulders $a$, and a pin, $e$, is passed through the inner end of the rod C to hold the same to the shank. The rod C is provided with a thumb-disk at its outer end, by pressing upon which the rod is moved.

To pick up a small piece of work, the tweezers are taken in the hand of the operator, and the rod C pushed forward by the thumb or palm of the same hand. This opens the jaws, and the piece of work may then be grasped by them, and will be held by releasing the pressure from the rod C, the spring D retracting such rod.

The shank of the tweezers may be suitably roughened to give a better hold for the fingers of the operator. These tweezers are very simple in construction and well adapted for the purpose before mentioned.

What I claim as my invention is—

1. Tweezers having jaws sprung together, in combination with a sliding spring-actuated rod for opening the jaws, substantially as and for the purpose set forth.

2. The tweezers described, consisting of the jaws A, having shoulders $a$, and sprung together at the point, the hollow shank B, sliding rod C, and spring D, substantially as described and shown.

This specification signed and witnessed this 25th day of April, 1879.

WILLIAM A. WALES.

Witnesses:
GEO. E. LINCOLN,
GEO. K. DAVIS.